(12) United States Patent
Taylor et al.

(10) Patent No.: US 6,476,286 B1
(45) Date of Patent: Nov. 5, 2002

(54) RECLAIMING TNT AND ALUMINUM FROM TRITONAL AND TRITONAL-CONTAINING MUNITIONS

(75) Inventors: William J. Taylor, Woodbury; Duane A. Goetsch, Andover, both of MN (US)

(73) Assignee: Gradiaent Technology, Blaine, MN (US)

( * ) Notice: Subject to any disclaimer, the term of this patent is extended or adjusted under 35 U.S.C. 154(b) by 0 days.

(21) Appl. No.: 09/569,661

(22) Filed: May 12, 2000

(51) Int. Cl.$^7$ .............................. A62D 3/00; B08D 9/00
(52) U.S. Cl. ..................... 588/203; 134/22.14
(58) Field of Search ................. 588/202, 203; 149/124; 134/22.1, 22.12, 22.13, 22.14, 167 R, 172

(56) References Cited

U.S. PATENT DOCUMENTS

| | | | |
|---|---|---|---|
| 5,363,603 A | | 11/1994 | Miller et al. .................. 451/40 |
| 5,370,845 A | * | 12/1994 | Miller et al. ............. 422/186.3 |
| 5,445,690 A | * | 8/1995 | Wulfman .................. 149/109.6 |
| 5,516,790 A | * | 5/1996 | Miller et al. ................. 588/202 |
| 5,524,545 A | * | 6/1996 | Miller et al. ................. 102/293 |
| 5,737,709 A | | 4/1998 | Getty et al. ................. 588/202 |
| 6,110,308 A | * | 8/2000 | Ewald et al. ............. 149/109.6 |
| 6,121,506 A | * | 9/2000 | Abel et al. .................. 588/200 |

* cited by examiner

*Primary Examiner*—Stanley S. Silverman
*Assistant Examiner*—Eileen E. Nave
(74) *Attorney, Agent, or Firm*—Henry E. Naylor

(57) ABSTRACT

A process for the recovery of TNT and aluminum from tritonal-containing military shells. The process uses a solvent in which the TNT is substantially soluble, but not the aluminum. This results in a liquid organic solvent phase and a solid aluminum particle phase. The aluminum particles are recovered by conventional solid-liquid separation techniques, such as filtering, gravity settling, and the like. The TNT is recovered from the solvent by flashing or evaporating the solvent and recrystallizing the TNT.

11 Claims, 1 Drawing Sheet

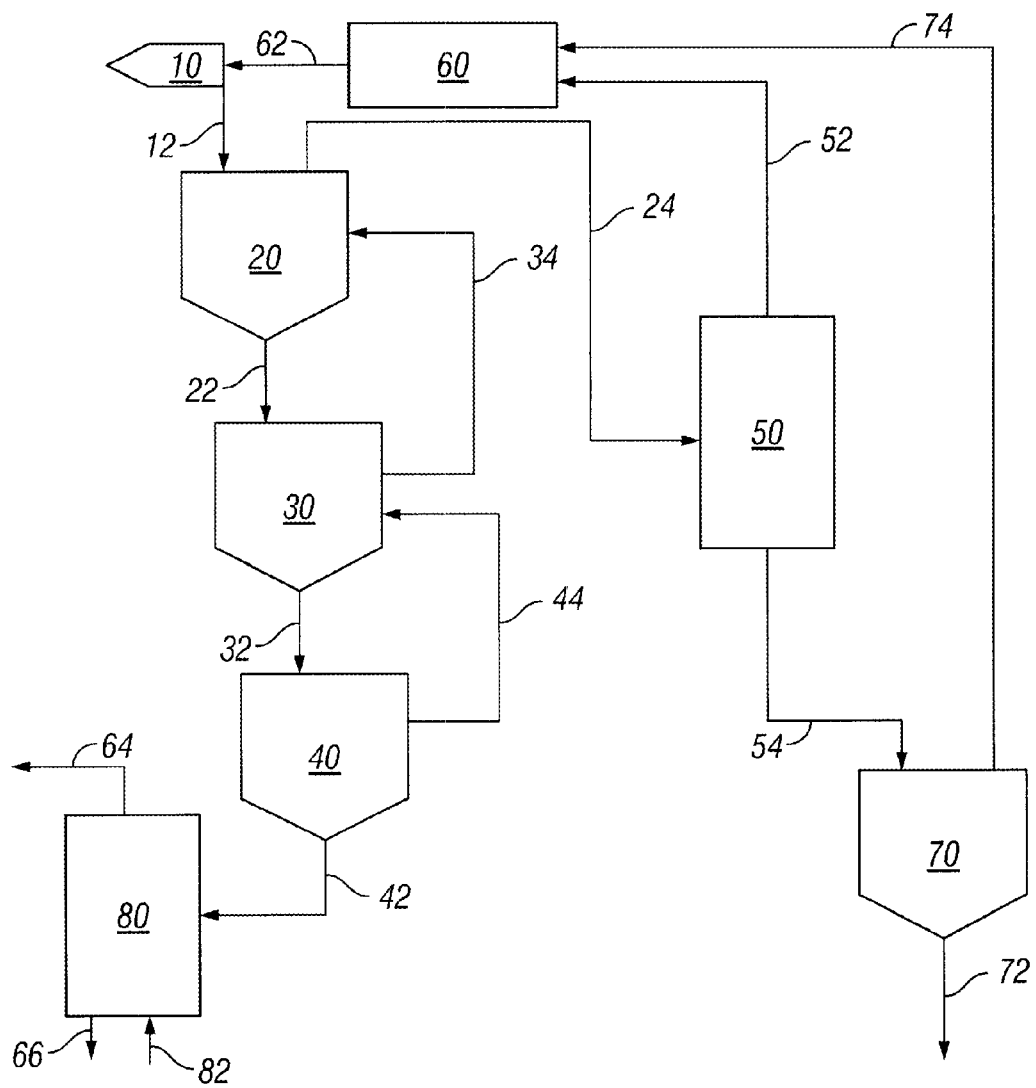

RECLAIMING TNT AND ALUMINUM FROM TRITONAL AND TRITONAL-CONTAINING MUNITIONS

FIELD OF THE INVENTION

The present invention relates to a process for the recovery of TNT and aluminum from tritonal-containing military shells. The process uses a solvent in which the TNT is substantially soluble, but not aluminum. This results in a liquid solvent phase and a solid aluminum particle phase. The aluminum particles are recovered by conventional solid-liquid separation techniques, such as filtering, gravity settling, and the like. The TNT is recovered from the solvent by flashing or evaporating the solvent and recrystallizing the TNT.

BACKGROUND OF THE INVENTION

Surplus munitions present a problem to the US military. Current budget constraints force the US military to prioritize its spending while effectively defending the interests of the United States. Defense budgets are further tightened because aging and surplus munitions must be guarded and stored. The US military regularly destroys a significant amount of its surplus munitions each year in order to meet its fiscal challenge. It also destroys a significant amount of munitions each year due to deterioration or obsolescence.

In the past, munitions stocks have been disposed of by open burn/open detonation (OBOD) methods—the most inexpensive and technologically simple disposal methods available. Although such methods can effectively destroy munitions, they fail to meet the challenge of minimizing waste by-products in a cost effective manner. Furthermore, such methods of disposal are undesirable from an environmental point of view because they contribute to the pollution of the environment. For example, OBOD technology produces relatively high levels of $NO_x$, acidic gases, particulates, and metal waste. Incomplete combustion products can also leach into the soil and contaminate ground water from the burning pits used for open burn methods. The surrounding soil and ground water must often be remediated after OBOD to meet environmental guidelines. Conventional incineration methods can also be used to destroy munitions, but they require a relatively large amount of fuel. They also produce a significant amount of gaseous effluent that must be treated to remove undesirable components before it can be released into the atmosphere. Thus, OBOD and incineration methods for disposing of munitions have become impractical owing to increasingly stringent federal and state environmental protection regulations. Further, today's ever stricter environmental regulations require that new munition and weapon system designs incorporate demilitarization processing issues. Increasingly stringent EPA regulations will not allow the use of OBOD or excessive incineration techniques, consequently, new technologies must be developed to meet the new guidelines.

Recovery and reuse methods, such as that of the present invention, are the most attractive alternative to the conventional destructive methods discussed above and can be used to recover substantially all of the munition components with very little waste generation. This state-of-the-art technology is feasible, safe, and relatively inexpensive. It also has the potential of meeting the recovery and reuse goals of demilitarization. Future demilitarization operations will be dominated by chemical conversion and recovery technologies that recover or convert the explosives and other components used in munitions manufacture to materials that can be recycled, or resold, in a cost effective environmentally acceptable manner.

One type of explosive system that presents a demilitarization problem are military shells that contain tritonal (a mixture comprised of TNT and aluminum powder) as the energetic component. Such shells also typically contain an organic liner material, such as an asphalt material, and a resin sealer. Clay is often dispersed within the resin matrix. The most common method used to remove tritonal from a shell is the use of a steam wand to melt the tritonal from the shell. Another method is to use autoclaves that are large enough to heat the entire shell, thereby melting the energetic material, which will then flow out of an open shell casing. Such methods have the disadvantage of melting not only the tritonal, but also the asphalt liner and resin sealer, resulting in a mixture of all these components. The use of steam also adds water that results in so called "pink water", that must also be treated before it can be released into the environment. Thus, the aluminum particles will mix with the TNT, asphalt liner material, and resin sealer. Such a technique results in a significant problem because the TNT, aluminum, asphalt, and resin are difficult to separate and purify once they are mixed together. Consequently, a significant amount of the aluminum powder that is dispersed in the resin and asphalt is unrecoverable.

In some instances, water condensate from the steam wand can react exothermally with the aluminum powder to produce an undesirable amount of heat. This undesirable amount of heat has the potential of causing the energetic material to spontaneously explode. Further, the asphalt liner has been shown to accelerate the TNT aging process, thus leading to unstable products that could initiate a spontaneous exothermic decomposition of the energetic materials. Water is also a contaminant in TNT and because it is difficult to separate it from TNT, the commercial value of the recovered TNT is reduced. A blend of such components also prevents its reuse as an explosive or its value in chemical conversion processes.

Therefore, there is a need in the art for a process that is capable of efficiently removing tritonal from a tritonal-containing military shell and recovering its individual components.

SUMMARY OF THE INVENTION

In accordance with the present invention there is provided a process for separately recovering TNT and aluminum particles from an explosive comprised of TNT and aluminum particles, which process comprises;

a) treating the explosive with a solvent in which TNT is substantially soluble and in which said aluminum particles are substantially insoluble, thereby resulting in a slurry of aluminum particles in TNT/solvent solution;

b) separating said aluminum particles from said TNT/solvent solution; and c) recovering the TNT from the solvent.

Also in accordance with the present invention there is provided a process for removing an explosive comprised of TNT and aluminum particles from a military shell and recovering the TNT and aluminum components, which military shell also contains at least one organic liner component, which process comprises;

a) opening said military shell to expose the explosive and organic liner component;

b) treating the exposed explosive and organic liner components with a solvent in which TNT is substantially soluble, but in which said aluminum particles and organic liner material are substantially insoluble;

c) removing said explosive component from said shell and leaving the organic liner material, thereby resulting in a slurry of aluminum particles in TNT/solvent solution;

d) separating the aluminum particles from the TNT/solvent solution;

e) recovering said TNT component from said solvent.

In a preferred embodiment of the present invention the solvent is selected from the group consisting of acetone and cyclohexanone.

In another preferred embodiment of the present invention there is an additional steps of removing the organic liner material from the shell and rinsing the shell to an effective cleanliness so that the shell can be recycled as scrap material.

In yet another preferred embodiment of the present invention the separation technique for separating the aluminum particles from the TNT/solvent solution is selected from the group consisting of gravity settling and filtration.

In still another preferred embodiment of the present invention the TNT is recovered from the solvent by evaporating the solvent and recrystallizing the TNT.

In yet another preferred embodiment of the present invention the recovered aluminum particles are dried using a substantially inert gas, preferably nitrogen.

In another preferred embodiment of the present invention the solvent, after TNT separation, is condensed and recycled.

In still another preferred embodiment of the present invention the organic liner material, which remains in the shell after tritonal removal, is removed from the shell casing using a suitable second solvent, which is then flashed off, thereby leaving an organic liner concentrate.

BRIEF DESCRIPTION OF THE FIGURE

The sole FIGURE hereof is a flow scheme of one preferred mode of practicing the present invention.

DETAILED DESCRIPTION OF THE INVENTION

Munitions on which the present invention can be practiced are those munitions, typically referred to as military shells, that contain tritonal as the energetic (explosive) component. Tritonal is a mixture of 2,4,6-trinitrotoluene (TNT) and aluminum powder. The typical weight ratio of TNT to aluminum is about 4:1. The military shell, which is usually in the form of a warhead, bomb, or projectile is usually coated on its interior surface with an organic liner material. Non-limiting examples of organic liner materials that are used for military shells include asphaltic liners, paints, and any other suitable liner material that provides a chemically stable coating that is capable of preventing the tritonal from contacting the metal casing. In most cases a sealer material is used to fill a gap left after the shell is filled with the explosive material. The sealer material will typically be comprised of a synthetic resin, or other suitable polymeric material and will usually be at the opposite end of the shell then the fuze. For example, a shell casing having a suitable organic liner is filled with molten explosive material. Upon solidification the explosive material will undergo a relatively small amount of shrinkage that will leave an unacceptable void, or space, at the filling end of the shell. This space will be filled with a suitable resin material that will undergo little, if any, shrinkage upon solidification. After the empty space is filled with resin material the shell is closed by screwing on the suitable end piece. For example, if the fuze is at the nose of the shell a base plate will the screwed onto the casing to complete the shell. If the fuze is at the base a suitable nose will be screwed onto the casing to complete the shell.

In the practice of the present invention, TNT and aluminum powder are recovered as valuable discrete commercial products. Conventional methods for disposing of tritonal-containing military shells, such as incineration, chemical degradation, and detonation are not capable of recovering the TNT and aluminum powder as discrete components.

The present invention can be practiced by first cutting open the shell, or casing, to expose its contents for removal. Any suitable technique can be used to open the shell and expose its contents. One preferred technique is the use of fluid-jet cutting technology. Fluid-jet cutting technology is disclosed in U.S. Pat. Nos. 5,363,603 and 5,737,709 both of which are incorporated herein by reference. Although the shell can be cut across its longitudinal axis at a point that will expose substantially all of the components for removal, it is preferred to expose the explosive component by defuzing the shell. This, or course is preferred for safety considerations.

Several approaches can be taken once the components of the shell are exposed. In a preferred embodiment, the sealer material is physically removed and the tritonal component of the shell is treated with a solvent in which only TNT is soluble and not aluminum or the organic liner material. This results in a slurry of aluminum particles in a TNT/solvent solution. It is preferred that the organic liner be left in the shell for further washout. The use of a solvent in which only the TNT is soluble has the effect of simultaneously cutting out the tritonal and dissolving the TNT in the solvent and leaving the aluminum as solid particles for relatively easy downstream solid liquid separation from the resulting slurry. It is preferred that the tritonal be removed by use of a preferred solvent at a temperature from about 0° C. to about 100° C., more preferably from a temperature of about 10° C. to about 100° C., and most preferably at a temperature from about 20° to about 85° C. A preferred solvent is one in which substantially all of the TNT component will dissolve at the process temperature. Non-limiting examples of solvents suitable for use herein include acetone, cyclohexanone, toluene, benzene, pyridine, N,N-dimethylformamide, dimethyl sulfoxide, 1-methyl-2-pyrrolidinone, tetrahydrofuran, hexamethylphosphoramide, methyl acetate, chlorobenzene, chloroform, 1,2-dichloroethane, diethyl ether, trichloroehtylene, ethanol, and mixtures thereof. More preferred solvents include acetone and cyclohexanone. The most preferred solvent is acetone.

It is within the scope of this invention that the tritonal be washed out of the shell by use of water or even a solvent in which the TNT is not soluble. In such a case, the TNT and aluminum particles are separated from the washout liquid and dried by conventional means, then treated with a preferred solvent in which only the TNT is soluble.

A preferred method of washing out the tritonal is by use of fluid jet washout technology at pressures that are effective to erode, or comminute, the explosive material during washout. It is preferred that the washout pressure be high enough to washout the tritonal, but low enough to leave the liner material in the shell casing. The preferred type of fluid jet washout equipment that can be used in the practice of the present invention is described in U.S. Pat. No. 5,737,709 which is also incorporated herein by reference. The operating pressure of the fluid jets will be from about 20,000 to about 150,000 psi, preferably from about 40,000 to about 150,000 psi. The diameter of the washout jet stream will typically be in the range of about 0.001 inch to about 0.02 inch.

In a preferred embodiment, the solvent will have a relatively high vapor pressure so that it can be flashed-off and a relatively simple separation step used to recover the TNT from the solvent. The preferred solvent preferentially dissolves the TNT which then allows the solid aluminum particles to be separated therefrom by utilizing conventional solid-liquid separation operations. The preferred solvent will not dissolve the organic liner or the polymeric sealer material. These materials, more typically the liner material, are left in the shell during tritonal washout. The organic liner material can be removed from the shell after explosive removal in separate washout steps. For example, a solvent can be used in which the liner material, thus washing out the liner material in solution and leaving the sealer material. The binder from the liner/solvent solution can then be recovered by evaporating or flashing-off, the solvent. The solvent can then be condensed and recycled. If the liner material is an asphaltic material it is preferred that the solvent be toluene. If the explosive material is removed leaving the sealer in the shell, the sealer can be removed by any suitable washout method or simply by heating the casing to a temperature at which the sealer can easily be removed or poured from the metal casing. Both the liner and sealer material can be removed by use of fluid jets or simple solvation with an appropriate solvent, or a combination solvation/fluid jet washout process.

After all of the chemical components have been removed from the shell the shell casing can now be recovered by cleaning it with water or an appropriate solvent to achieve a desired 5×cleanliness. It is preferred that the fluid jet washout step be able to achieve a 5×cleanliness that is required by Army Material Command Regulation 385-5 for explosives and Army Material Command Regulation 385-61 for chemical weapons.

As previously mentioned the aluminum particles can be recovered from the TNT/solvent solution by conventional solid-liquid separation techniques including gravity settling and/or filtration. In one preferred embodiment of the present invention the aluminum particles are recovered by counter current flow technology. That is, the slurry of aluminum particles in TNT/solvent solution are conducted from one gravity settling vessel to another. After a suitable period of time to allow a substantial amount of the aluminum particles to settle the TNT/solvent solution is decanted to the next downstream vessel. The remaining aluminum particles are treated with counter flowing solvent to remove any TNT remaining with the settled aluminum particles. The number of settling stages can be from about 1 to about 10, preferably from about 1 to 4.

The present invention is best understood with reference to the FIGURE that shows one preferred embodiment for practicing the invention. A solvent stream 62 is directed into an open shell 10 in which the tritonal is exposed. Solvent, TNT, and aluminum particles flow via line 12 from the shell 10 to solid/liquid separation vessel 20. If a preferred solvent is used substantially all of the TNT will be dissolved in the solvent and the aluminum particles will be in particulate form. Separation vessel 20 will preferably be a gravity settling tank wherein a portion of the aluminum particles will settle and be passed to next downstream separation vessel 30 via line 22. A TNT/solvent solution containing a much smaller aluminum particle concentration will be drawn off the top of separation vessel 20 and passed via line 24 to liquid/liquid separation unit 50. If a preferred solvent is used, the solvent can be flashed-off and passed to solvent storage facility 60 via line 52. The aluminum particles that flow to next downstream separation vessel 30 will still carry with them a fraction of the TNT/solvent solution, but the concentration of aluminum particles in the solution will be increased. Settling of aluminum particles will also take place in separation vessel 30 and be passed to the next downstream solid/liquid separation vessel 40 via line 32. A substantially aluminum-free TNT/solvent stream will be drawn from separation vessels 30 and 40 via line 34 and 44 respectively and conducted to separation vessels 20 and 30 respectively. Although this figure shows a series of three solid/liquid separation vessel, it is to be understood that from about 1 to 10 such vessels in series are preferred wherein the aluminum particle concentration continually increases as it moves to each downstream vessel and wherein it is contacted with an ever purer stream of TNT/solvent solution.

The aluminum particles that settle in the last solid/liquid separation vessel (40 in the figure hereof) are passed to drier 80 via line 42. The drier can be of any conventional design for drying such materials. A preferred drier is one wherein an inert gas, preferably nitrogen, is fed via line 82 into the drier for contacting the aluminum particles and carrying overhead via line 64 any remaining solvent. The remaining solvent can be recycled to solvent storage facility 60. Relatively pure aluminum particles are recovered via line 66.

The cascading TNT/solvent solution is passed via line 24 to liquid/liquid separation unit 50 which has been described above. The remaining TNT, after evaporating or flashing the solvent, is passed via line 54 to TNT purification unit 70, which is preferably operated to recrystallize the TNT. The TNT can be crystallized, or condensed, from the solvent. Crystallized TNT can be collected as a product stream. Condensed liquid TNT can be fed to a belt flaker to produce TNT flakes as the final TNT product. The TNT, which is now in substantially pure form, can be collected via line 72. Any remaining solvent is recovered and drawn overhead and passed via line 74 to solvent storage facility 60.

What is claimed is:

1. A process for removing an explosive comprised of TNT and aluminum particles from a military shell containing same and recovering the TNT and aluminum particles, which military shell also contains at least one organic liner component, which process comprises:

a) opening said shell to expose the explosive and organic liner component;

b) treating the exposed explosive and organic liner component with a solvent in which TNT is substantially soluble, but in which said aluminum particles and Organic liner component are substantially insoluble;

c) removing only the explosive from the shell, thereby resulting in a TNT/solvent solution containing aluminum particles, and leaving said organic liner component in the shell;

d) separating the aluminum particles from the TNT/solvent solution;

e) recovering said TNT component from said solvent.

2. The process of claim 1 wherein the solvent is selected from the group consisting of acetone, cyclohexanone and mixtures thereof.

3. The process of claim 1 wherein the solvent is acetone.

4. The process of claim 1 wherein the separation technique for separating the aluminum particles from the TNT/solvent solution is selected from the group consisting of gravity settling and filtration.

5. The process of claim 1 wherein the TNT is recovered from the solvent by evaporating the solvent.

6. The process of claim 1 wherein the recovered aluminum particles are dried using a substantially inert gas.

7. The process of claim 6 wherein the substantially inert gas is nitrogen.

8. The process of claim 1 wherein the solvent, after TNT recovery, is condensed and recycled.

9. The process of claim 1 wherein the shell is opened by use of a high pressure jet of fluid.

10. The process of claim 1 wherein the shell is opened by removing its fuze by use of a high pressure jet of fluid.

11. The process of claim 10 wherein the fluid is a solvent selected from acetone, cyclohexanone, and mixtures thereof.

* * * * *